(12) United States Patent
Noehl

(10) Patent No.: US 9,169,881 B2
(45) Date of Patent: Oct. 27, 2015

(54) DOUBLE CLUTCH

(75) Inventor: Oliver Noehl, Buehlertal (DE)

(73) Assignee: SCHAEFFLER TECHNOLOGIES AG & CO. KG., Herzogenaurach (DE)

( * ) Notice: Subject to any disclaimer, the term of this patent is extended or adjusted under 35 U.S.C. 154(b) by 798 days.

(21) Appl. No.: 13/003,917

(22) PCT Filed: Jun. 29, 2009

(86) PCT No.: PCT/DE2009/000902
§ 371 (c)(1),
(2), (4) Date: Jan. 13, 2011

(87) PCT Pub. No.: WO2010/226579
PCT Pub. Date: Jan. 21, 2010

(65) Prior Publication Data
US 2011/0114437 A1 May 19, 2011

(30) Foreign Application Priority Data

Jul. 14, 2008 (DE) .......................... 10 2008 033 036

(51) Int. Cl.
| F16D 21/06 | (2006.01) |
| F16D 25/08 | (2006.01) |
| F16D 25/10 | (2006.01) |

(52) U.S. Cl.
CPC .............. *F16D 21/06* (2013.01); *F16D 25/08* (2013.01); *F16D 25/083* (2013.01); *F16D 25/10* (2013.01); *F16D 2021/0607* (2013.01); *F16D 2021/0669* (2013.01); *F16D 2300/021* (2013.01); *Y02T 10/76* (2013.01)

(58) Field of Classification Search
CPC ............ F16D 25/08; F16D 2021/0669; F16D 2021/2021; F16D 2021/0607
USPC .................. 192/85.44, 85.55, 48.603, 48.606, 192/48.607, 48.611, 48.91, 85.51
See application file for complete search history.

(56) References Cited

U.S. PATENT DOCUMENTS

| 2,794,349 | A | * | 6/1957 | Smirl ............................ 477/98 |
| 2,969,052 | A | * | 1/1961 | Randol et al. .................. 477/99 |
| 4,440,281 | A | * | 4/1984 | Hauguth ..................... 192/48.8 |
| 5,366,054 | A | * | 11/1994 | Cooke et al. ............... 192/70.17 |
| 6,634,477 | B2 | * | 10/2003 | Beneton et al. ............. 192/48.8 |
| 7,293,637 | B2 | * | 11/2007 | Janson et al. ............. 192/48.611 |
| 8,590,685 | B2 | * | 11/2013 | Noehl et al. ............ 192/48.606 |
| 2004/0206599 | A1 | * | 10/2004 | Hegerath .................. 192/87.11 |
| 2004/0238313 | A1 | * | 12/2004 | Rogner et al. ........... 192/85 CA |
| 2005/0279603 | A1 | * | 12/2005 | Agner ........................ 192/48.8 |

(Continued)

FOREIGN PATENT DOCUMENTS

| DE | 10 2006 057 482 A1 | 6/2008 |
| FR | 2 797 004 A | 2/2001 |
| WO | 2005/119080 A | 12/2005 |

*Primary Examiner* — Robert Hodge
*Assistant Examiner* — Ryan Dodd
(74) *Attorney, Agent, or Firm* — Lucas & Mercanti, LLP

(57) ABSTRACT

A double clutch which has two friction clutches, a central pressure-exerting plate and two pressure plates that are axially movable relative to the pressure-exerting plate with the interposition of friction linings of two clutch disks, which mesh with each transmission input shaft, of actuating devices. Here, the pressure plates are acted on by transmission elements by the actuating devices directly without a lever action. Furthermore, for cooling and lubrication of actuating devices and transmission elements, an annular chamber with an increase in fluid volume can be formed.

26 Claims, 1 Drawing Sheet

(56) References Cited

U.S. PATENT DOCUMENTS

Figure 1:
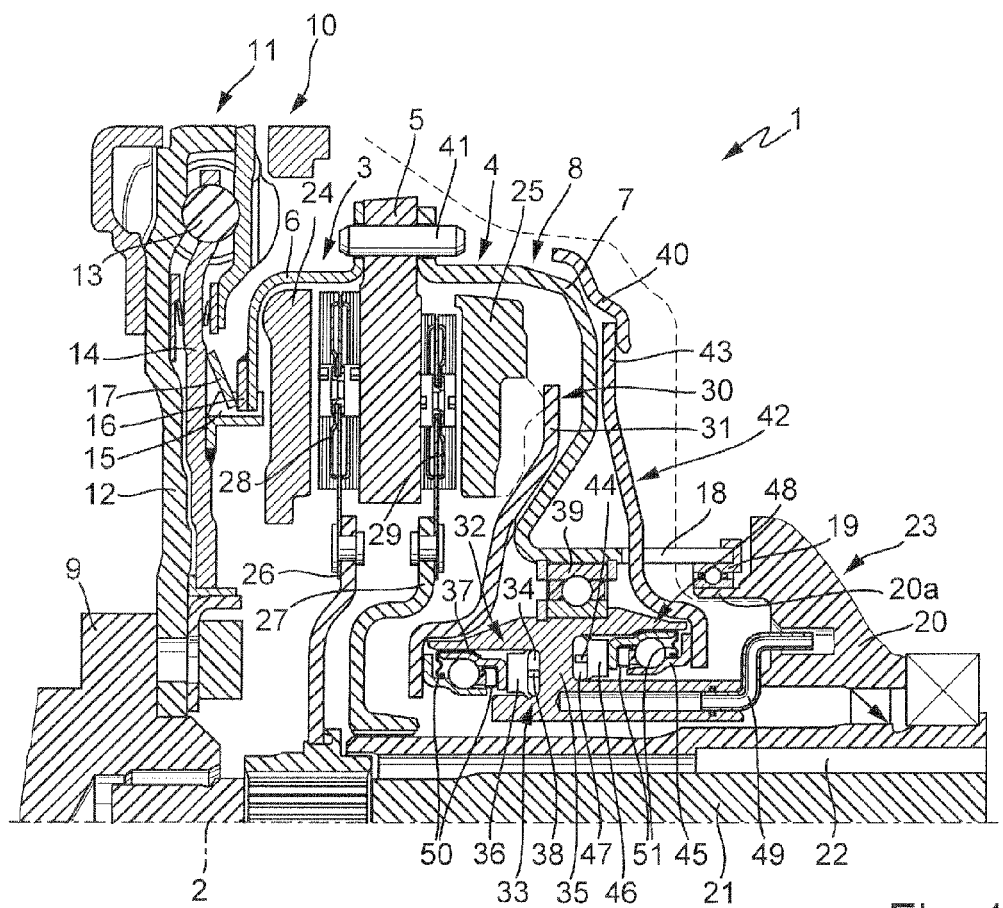

| | | | |
|---|---|---|---|
| 2006/0042909 A1* | 3/2006 | De Maziere | 192/87.11 |
| 2006/0086586 A1* | 4/2006 | Braford | 192/87.11 |
| 2006/0289263 A1* | 12/2006 | Friedmann et al. | 192/48.8 |
| 2011/0114435 A1* | 5/2011 | Noehl et al. | 192/48.1 |
| 2011/0114436 A1* | 5/2011 | Noehl et al. | 192/48.601 |
| 2011/0132712 A1* | 6/2011 | Noehl et al. | 192/48.601 |

* cited by examiner

U.S. Patent    Oct. 27, 2015    US 9,169,881 B2

DOUBLE CLUTCH

This application is a 371 of PCT/DE2009/000902 filed Jun. 29, 2009, which in turn claims the priority of DE 10 2008 033 036.1 filed Jul. 14, 2008, the priority of both applications is hereby claimed and both applications are incorporated by reference herein.

The invention relates to a double clutch with two friction clutches driven by a drive unit with a common clutch cover and a pressure-exerting plate connected rigidly with said housing with two pressure-exerting surfaces as well as two axially displaceable pressure plates respectively facing a pressure-exerting surface.

Double clutches with two friction clutches with a clutch cover and a central pressure-exerting plate connected rigidly with said cover are known. Thereby, the pressure plates are axially displaced by means of actuating devices, in that radially inside a diaphragm spring or lever element is axially pressurized with a pre-set release stroke. Thereby, depending upon embodiment of the assigned friction clutch, said clutch supports itself on clutch cover as a forcefully pressed thus as forcefully closed or pressed open thus forcefully opened friction clutch, as one-armed or two-armed lever by forming a mechanical advantage so that the axial stroke of the actuating device is longer than the stroke of the pressure plate from fully opened state of the friction clutch, in which torque is not transmitted, to the fully closed state, by which the maximum torque is transmitted. In particular, in congested assembly space, actuating devices must be adapted to this lengthened actuation stroke.

Furthermore, exact assignment of an axial stroke of the actuating device to a stroke of the pressure plate and therefore an assignment of the torque transmitted via the friction clutch depends upon the elastic properties, in particular, their tolerances, for instance, the production tolerances and deviations throughout the service life. This way, axial strokes caused by these tolerances likewise increase, since the axial strokes must be dimensioned based on maximum deviation. Moreover, the assignment of an axial stroke to the actual stroke of the pressure plate decreases and/or features hysteresis.

The object is therefore to propose a double clutch that features reduced axial strokes of actuating devices.

The object is solved by means of a double clutch with two friction clutches driven by a drive unit with a common clutch cover and a pressure-exerting plate connected rigidly with said housing with two pressure-exerting surfaces as well as two axially displaceable pressure plates facing a pressure-exerting surface, whereby between each pressure plate and the pressure-exerting plate, friction linings of a clutch disk connected non-rotatably with respectively one transmission input shaft of a transmission can be clamped to establish frictional engagement through axial pressure-exertion by the pressure plates respectively by means of an actuating device and the pressure plates are actuated by means of transmission elements pressurized by the actuating devices and the pressure plates are displaced by the same actuation stroke set on the actuating devices.

This means that the transmission elements are not supported as levers on clutch cover but rather transform the axial stroke determined by the actuating devices into a stroke of the pressure plate conforming in magnitude and direction to the said devices along a displacement essentially perpendicular to the axis of rotation of the double clutch. Thereby, the transmission elements are preferably formed disk-shaped; stiff piston plates that are subject to pressure on their internal circumference by the actuating devices and radially outside they displace the pressure plate.

An internal combustion engine with a crankshaft and/or an electric motor with a drive shaft can serve, for instance, as drive unit. In combination, a hybrid drive can be provided with alternative or complementary drives and at least an internal combustion engine and at least an electric motor can form the drive unit.

The two friction clutches are preferably dry single-disk clutches, with a metallic friction surface on the pressure-exerting plate and pressure plates as well as clutch disks bearing the friction linings forming companion friction surfaces. The friction linings of the clutch disks are preferably equipped with cushion deflection, furthermore, the pressure plates are closed axially displaceably against the effect of energy accumulators such as leaf springs, so that during the opening of a friction clutch, the corresponding pressure plate is displaced in the opening direction.

At least one of the two friction clutches is designed as self-opening. This means that upon relieving the actuating device, the friction clutch transforms from the closed into opened state. In a preferable manner, both friction clutches are designed as forcefully closed, thus closed by the respective actuating devices closed or pulled friction clutch, so that both friction clutches are self-opening, as soon as an actuating device, for instance, as result of defect, is no longer functional.

The two actuating devices can be disposed by means of a common mounting around the two transmission-input shafts. Hereby it has proved advantageous, when the mounting is rotatable on the clutch cover and is supported non-rotatably on transmission housing. A housing-fixed mounting of the actuating devices can be proposed, which exerts the supporting force in the clutch cover so that the double clutch forms a closed force flow of the clamping forces and counteracting forces for the displacement of pressure plate and formation of frictional engagement for transmission of torque from the clutch cover to the clutch disks. In so far is the double clutch independent of tolerance fluctuations, for instance, an offset of crankshaft and transmission input shafts. Through this, axial strokes can be dimensioned exactly and vibrations as well as other influences that result through displacement of the actuating devices on the transmission housing, for instance, the introduction of transmission vibrations or axial vibrations of the internal combustion engine, which leads to a pumping effect between the double clutch and the actuating devices fixed on the transmission can be avoided. An otherwise applicable torsional vibration damper in one or both clutch disks can be omitted.

Furthermore, it has proved advantageous, when the clutch cover is supported rotatably on the transmission housing. For this purpose, the clutch cover can feature an axial projection facing the transmission, on which the mounting is held and by means of which the double clutch is rotatably supported on the transmission housing. Such a projection is preferably disposed radially inside, for instance, at the radial height of actuating devices, whereby the clutch cover is axially fixed on a shoulder axially projecting from the transmission housing by means of the radial bearing. For compensation of axial vibrations of the transmission side relative to the drive side, the double clutch can be mounted axially limitedly, preferably against the effect of an axially acting energy accumulator directly on the crankshaft or with non-rotatably interposed torsional vibration damper, for instance, on the dual mass flywheel, for instance, by means of a splined connection.

Through the support of the double clutch on the transmission housing, support of the double clutch on one of the two transmission-input shafts can be avoided, so that said shafts may not be exposed to bending loading by the double clutch and in this regard, they do not need separate dimensioning. Furthermore, vibration such as tumbling vibration from the transmission to double clutch or from said double clutch to the transmission is propagated in this manner. The transmission can be such with a primary output and a secondary output. In a preferable manner, the double clutch is nonetheless used for a double clutch transmission with two partial drive trains forming the power-shift transmission, by which, respectively, when a gear is selected, a partial drive train transmits torque from the drive unit to the wheels of the vehicle when friction clutch is closed and in the other partial drive train when friction clutch is opened a subsequent gear is engaged and/or is retained after engagement in the selected state. Shifting occurs through overlap of the two friction clutches of the double clutch, whereby the closed friction clutch is opened in a slipping manner and the opened friction clutch is closed in a slipping manner, so that during overlap torque is transmitted via both partial drive trains alternately.

It has proved advantageous when both friction clutches are forcefully closed friction clutches in order to avoid blocking the double clutch transmission in the event of failure of an actuating device, in particular, during an overlap shifting. Owing to the advantageous arrangement of a central pressure plate with opposite pressure plates of the friction clutch, the actuation strokes for closing the friction clutches are disposed oppositely to one another in their function.

The mounting of the double clutch on the transmission housing and omission of bearing of said housing, on one of both transmission input shafts disposed coaxially to one another, the actuating device disposed between the crankshaft and the central pressure plate can be guided, disposed or supplied with fluid. This means that undisturbed by a bearing of the double clutch in the space between transmission input shafts and the elements forming the frictional engagement, disposed radially outside, such as pressure plates, and pressure-exerting plate, as well as axially between the clutch disks and the transmission housing, a continuous assembly space for mounting the two, preferably combined in one retainer, actuating devices can be provided. In an advantageous manner for this purpose, mounting of adjacent clutch disks can be spaced axially away from the friction linings on the corresponding transmission input shaft executed as a hollow shaft, so that the assembly space can be additionally enlarged.

The actuating devices can be mechanical lever devices, which, for instance, are driven by electric motors from radially outside. Particularly advantageous is a pneumatic or preferably hydrostatic actuation of the double clutch, whereby the common mounting of actuating devices is formed by a slave cylinder housing, in which, to respectively pressurize the transmission element respectively an externally pressurized slave cylinder is accommodated. The slave cylinder feature for this purpose, respectively a ring piston that is axially displaceable in a pressure chamber that can be pressurized from outside and that actuates the transmission elements via an interposed actuating bearing.

The pressure chambers of the slave cylinder, for instance, are pressurized by a master cylinder respectively that is activated a control device by means of the electric motor from, or by a pump, if applicable, with effect of the pressure accumulator, whereby the pump can be driven by the drive unit or by an electric motor. In an advantageous manner, a so-called power pack can be used, which switches several pressure circuits via a central pump and corresponding valves, whereby both friction clutches can be actuated and the transmission shifted and the circuit lubrication of the annular chamber described below can occur.

Because of direct actuation of pressure-plates without a mechanical advantage of the transmission elements, the actuating bearings are subjected to great loads. As a result, great frictional heat occurs, in particular, for a large number of clutch actuations, for instance, in city traffic, in the actuating bearings, which in particular, for grease-filled, encapsulated actuating bearings, the heat can be dissipated poorly. It is therefore proposed, between the transmission elements and the slave cylinder to form an annular chamber sealed outwards, which at least comprises the actuating bearing on one side. Thereby, the annular chamber is at least partially filled with fluid, so that the cooling volume of the actuating bearing increases. Thereby, the fluid can feature lubricating and/or cooling properties according to requirements.

The annular chamber can be connected outwards, for instance, with a fluid-circulating device, for instance, a pump, which circulates the fluid inside annular chamber. For this purpose, a supply line and return line can be provided. In an advantageous manner, the same fluid is used both as pressure medium in the annular chamber as in the slave cylinders for pressurizing said cylinders, so that if applicable occurring leakages of one or both slave cylinders in the annular chamber or vice versa is insignificant for the composition of fluid. It is also possible to connect the annular chamber with the transmission oil sump. The circulation can occur by means of a pump driven by the drive unit or an independent, for instance, by means of electric motor driven pump unit (power pack).

Furthermore, the fluid in the annular chamber can be atomized, whereby, in particular, the heated actuating bearing extracts vaporization heat and therefore cools down. Alternatively, in simple exemplary embodiments, an increase of the volume of the annular chamber with an increase in lubricant content like grease or oil can lead to balanced heat content of the actuating bearing.

In an advantageous exemplary embodiment, the annular chamber between the transmission elements and the ring piston that is sealed against the slave cylinder is sealed by means of rolling bodies outside the rolling actuating bearing. Thereby, the bearing rings, for instance, internal ring and external ring are sealed against one another such that rolling bodies as well as friction surfaces and/or rolling surfaces are disposed on the corresponding bearing rings in the annular chamber. The sealing line thereby extends from the internal circumference of the slave cylinder housing via the internal surface of ring piston, the internal side of actuating bearing to the transmission elements.

Between the transmission elements, which are advantageously executed as dense piston plates and the clutch cover, the annular chamber is sealed by means of axially displaceable piston plates. The piston plates are fixedly attached as tight weld-on components, axially displaceably relative to one another, for instance, as transmission element or clutch cover, and features a sealing surface against axial component displaceable relative to said. In a particularly advantageous manner, a sealing surface comprising a bearing ring, for instance, a bearing ring provided radially outside, which is axially fixed with the transmission element and is therefore axially displaceable relative to the clutch cover or relative to a component fixed to said housing could be sealed.

The piston plates are thereby advantageously formed as sleeves, whereby an axial end section is sealed with an internal circumference of a transmission element, with the clutch cover or with a component axially fixed with said housing and is connected in a sealing manner and an oppositely located axial end section against an internal circumference of a corresponding, transmission part axially displaceable relative to said, with the clutch cover or with a component connected with said component by means of an axially displaceable seal.

For the formation of a sleeve-shaped sealing surface on the clutch cover, a sleeve-shaped component can be fixed axially on the axial shoulder by means of which the double clutch is mounted on the transmission housing and is sealed opposite a bearing ring featuring an axial shoulder or sealed in another manner on the transmission element or on the actuating bearing. The support bearing for mounting the slave cylinders can be mounted on this component instead of directly on the axial shoulder, so that this is likewise disposed in the annular chamber and is therefore lubricated by the fluid in the annular chamber and if applicable cooled.

Pressurization of pressure chambers of the slave cylinders can occur respectively by means of a pressure line, whereby the corresponding pressure supply devices like master cylinders or pump are connected with this pressure line. Thereby, the line can be routed through the transmission. In particular, when a pump is used, a valve block for pressure control can be accommodated on the individual slave cylinders, preferably in connection with a valve block for the control of the transmission in the adjacent transmission wall, so that only a pressure supply line must be provided in the common valve block and from there a pressure line can be provided directly from the transmission in the slave cylinder. In a similar manner, the circulation in the annular chamber can be controlled via a supply line and return line from the transmission housing permanently or for instance depending upon the temperature of the fluid.

The slave cylinder housing features a torque multiplier relative to the transmission housing, which prevents the slave cylinder housing from rotation because of the drag torque of the actuating bearing, support bearing and the seals of the ring piston. For this purpose, between slave cylinder housing and transmission housing a form closure can be provided in circumferential direction, for instance, a nose engaging with a recess. Alternatively, the torque multiplier can at least be formed by one of the pressure lines, the supply and/or return line.

In the same manner, besides a double clutch, also a simple friction clutch with a clutch cover driven by a drive unit and a pressure plate with pressure-exerting surfaces connected rigidly with said housing as well as an axially displaceable pressure plate facing this pressure-exerting surface is incorporated by the inventive concept, whereby between the pressure plate and the pressure plate friction linings of a clutch disk connected non-rotatably with a transmission input shaft of the transmission can be clamped to establish the frictional engagement by axially pressurizing the pressure plate by means of an actuating device, the pressure plate is actuated by means of a transmission element actuated by the actuating device and the pressure plate is displaced by the same actuation stroke set on the actuating devices. Furthermore, the activating device can be mounted rotatably by means of the support bearing and as well as an actuating bearing provided between the actuating device and the transmission element in a common annular chamber. Further advantageous embodiments can be provided also for the simple clutch in correspondence with the embodiments for the double clutch, whereby the seal of the annular chamber is rigid instead of a flexible embodiment for the second slave cylinder, for instance, by means of the sealing plate.

Figure 2:
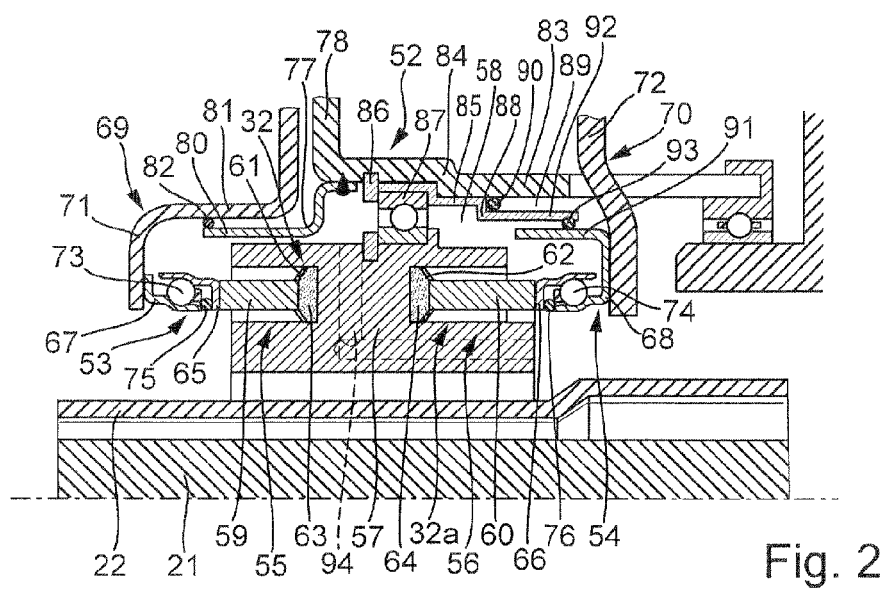

The invention is illustrated in detail by means of FIGS. 1 and 2. Shown are as follows:

FIG. 1 a partial section through an exemplary embodiment of a double clutch and;

FIG. 2 a section of the double clutch of FIG. 1 with a modified actuating devices section.

FIG. 1 shows a double clutch 1 in partial section above the axis of rotation 2. The double clutch 1 incorporates two friction clutches 3, 4 that feature the same central pressure-exerting plate 5 that is permanently connected with the cover parts 6, 7 of the clutch cover 8. The clutch cover 8 is driven by the crankshaft 9 of an internal combustion engine—not depicted in detail. For this purpose, in the depicted exemplary embodiment, a torsional vibration damper 10—here in the form of the dual mass flywheel 11—with an input part 12 connected with the crankshaft 9. The output part 14 limitedly rotatable against the effect of the energy accumulators 13 with respect to the input part 12 features an axially protruding tooth profile 15, into which a complimentary tooth profile 16, for instance, as shown engages with an internal spline of the cover part 6. The double clutch 1 is thereby clamped with respect to the crankshaft 9 and against the torsional vibration damper 10 by means of an axially acting energy accumulator 17, for instance, diaphragm spring, in the shown exemplary embodiment with respect to the output part 14 of the torsional vibration damper 10. In a further exemplary embodiment, the clamping effect with respect to the drive side can occur exactly on other components as splines on the cover part 6.

The clutch cover 8 is supported against the effect of the energy accumulator 17 on the transmission side by means of the axial projection 18 of the cover part 7. Said part is rotatably and axially fixed by means of a loose bearing 19 disposed on an axial shoulder 20a of the transmission housing 20. Through this, the double clutch 1 is received and/or radial supported both on drive side as well as on transmission side. Axis offsets between the crankshaft 9 and the transmission input shafts 21, 22 of the transmission 23, which can be a double clutch transmission, as well as axial vibrations due to combustion processes and tumbling vibrations of the double clutch 1 are advantageously compensated relative to one another by means of clamping of a small clearance of the tooth profiles 15, 16.

Radially within the clutch cover 8 for the formation of friction clutches 3, 4 respectively, pressure plates 24, 25 are provided, which by means of leaf springs—not depicted—connect the pressure plates 24 non-rotatably with the clutch cover 8, for instance, the cover parts 6, 7 and hold the pressure plates in opening position of the friction clutches 3, 4. Between the pressure-exerting plate 5 and the pressure plates 24, 25 respectively a clutch disk 26, 27 is provided with friction linings 28, 29 for the formation of frictional engagement of the friction clutches 3, 4. The clutch disks 26, 27 are connected non-rotatably with the transmission input shafts 21, 22, for instance, splined.

The pressure plate 25 of the friction clutch 4 is pressurized axially by a transmission element 30 in the form of piston plate 31 as depicted here; the formation of stroke-dependent frictional engagement between the pressure plate 25 and the pressure-exerting plate 5 on the other hand occurs with the friction linings 29 of the clutch disk 27. Pressurization occurs by means of the actuating device 32 in the form of slave cylinder 33 pressurized from outside with a slave cylinder housing 35 forming the pressure chamber 34, in which a ring piston 36 axially displaceable by pressure, depending upon the pressure acting in the pressure chamber 34, is accommodated. Between ring piston 36 and piston plate 31 is an actuating bearing 37 accommodated, so that rotational speed decoupling between the stationary ring piston 36 and the rotating piston plate 31 is facilitated.

The piston plate 31 is formed stiff and is supported in the depicted exemplary embodiment by means of the web 38 provided on the piston 36 or over studs distributed over the circumference for a fully opened friction clutch 4 on the slave cylinder housing 35. The piston plate 31 transmits a pre-set axial stroke from ring piston 36; magnitude- and direction conform, to the pressure plate 25. As a result, there is no speed ratio between pressure plate 25 and ring piston 36, so that the stroke of ring piston 36 essentially and at best by accounting for wear of the friction linings and of production tolerances can be limited to the stroke of the pressure plate 25 from fully engaged to fully disengaged state of the friction clutch 4. As a result, the axial assembly space of the slave cylinder 33 can be shortened.

The slave cylinder housing 35 is received by means of the support bearing 39 axially fixed and rotatably on the clutch cover 8—as shown here on the internal circumference of the axial projection 18. By means of a torque multiplier—not depicted—the slave cylinder housing 35 is supported on the transmission side and is thus stationary. Through the closed force flow within the double clutch 1 during the actuation process of the friction clutch 25, the double clutch 1 is independent of external influences and can therefore be disengaged particularly precisely. For this purpose, the slave cylinder housing 35 is supported over the support bearing 39 on the clutch cover 8, the ring piston 36 is supported on the slave cylinder housing 35 and pressurizes the pressure plate 25, which is clamped against the pressure-exerting plate 5 fixed on the clutch cover 8, so that a very short force flow occurs.

The friction clutch 3 is actuated in a similar manner and by exploiting the same advantages. To displace the pressure plate 24 it is pressurized by tie bars 40 distributed over the circumference, disposed in circumferential direction between the rivets 41, corresponding cutouts of the cover parts 6, 7—not depicted—tie through and clasp the pressure plate 24. The tie bars 40 are axially pressurized outside the clutch cover 8 by the likewise stiff transmission element 42 like piston plate 43 that penetrates through cutouts of the axial projection 18. The piston plate 43 features cutouts—not depicted in detail—which like the cutouts of the axial projection. On the internal circumference of the piston plate 43 the actuating bearing 45 acts, which is pressurized by the ring piston 46, which is guided axially displaceably in the pressure chamber 47 of the slave cylinder 48. By means of the web 44, the transmission plate 43 is supported in the opened state of the friction clutch 4 on the slave cylinder housing 35.

The two slave cylinders 33, 48 are disposed axially in one ring-shaped slave cylinder housing 35, whereby the ring piston 36, 46 are disposed on the opposite sides of the slave cylinder housing 35. The pressure supply for the pressure chambers 34, 47 occurs by means of pressure lines distributed over the circumference and routed between the transmission housing 20 and the slave cylinder housing 35, whereby in the depicted section only a pressure line 49 is visible. The pressure chambers 34, 47 are controlled and pressurized via the pressure lines. Pressure transmitted by means of the pressure medium to the pressure chambers 34, 47 can be provided by means of the master cylinder or by means of a pump, whereby, when using a pump, appropriate control valves control the pressure to be transmitted to the slave cylinders 33, 48.

Because of the actuation of the pressure plates 24, 25, without mechanical advantage, the forces acting on the actuating bearings 37, 45 as well as on the support bearing 39 are accordingly high. Particularly the actuating bearings are therefore dimensioned for great forces and high operating temperatures because of internal friction of the bearing. In particular, the actuating bearings are filled with special grease and protected by means of the sealing washers 50, 51 against leakage of grease.

FIG. 2 shows a section of double clutch 1 depicted in FIG. 1 with a modified activation system 52 of the both friction clutches 3, 4 (FIG. 1) with the actuating devices 32, 32a. For improved cooling and lubrication of the actuating bearing 53, 54, within the internal circumference, facing away from the transmission input shafts 21, 22 of the slave cylinder housing 57, containing the two slave cylinders 55, 56, a annular chamber 58 is partitioned in an outwardly sealed manner. The annular chamber 58 is sealed by the seals disposed on the ring pistons 59, 60 like U-seals 61, 62 against the pressure chambers 63, 64.

The internal rings 65, 66 of the actuating bearing 53, 54 are respectively connected in a sealed manner with the ring piston 59, 60, the radially external bearing rings 67, 68 are respectively connected with the transmission elements 69, 70 like piston plates 71, 72. The bearing rings 67, 68 are sealed against the bearing rings 65, 66 radially outside by means of the rolling bodies 73, 74 of the actuating bearing 53, and 54 by means of ring seals 75, 76. Through this, besides the internal surfaces of the bearing rings 65, 66, 67, 68 also the rolling bodies 73, 74 can be brought directly in contact with the fluid in the annular chamber 58 fluid like oil or grease and therefore be effectively lubricated and cooled by the large volume of fluid at disposal.

For sealing the piston plate 71 against the clutch cover 78, a sleeve-shaped sealing plate 77 is tightly fixed on the clutch cover 78 and sealed against an axial section 81 by means of a ring seal 82, disposed parallel to an axial shoulder 80 of the sealing plate 77. Upon displacement of the transmission device 69 during actuation of the friction clutch, the ring seal 82 slides on the internal circumference of the section 81 or on the external circumference of the axial shoulder 80, depending on which one of the two components is fixed on the ring seal 82.

For sealing the clutch cover 78 against the transmission element 70, the axial projection 83 is formed radially stepped in contrast to the axial shoulder 18 of FIG. 1. On the internal circumference of the step 84 is a likewise stepped sealing plate 85 disposed, which is axially fixed between the step 85 and a stop ring 86 of the support bearing 87. The support bearing 87 is mounted thereby on the sealing plate 85. A further step 88 of the sealing plate 85 provides a radial gap 89 between the sealing plate 85 and the axial shoulder 83, in which a ring seal 90 for sealing the sealing plate 85 against the clutch cover 78 is fitted. The axially displaceable sealing of the sealing plate 85 with respect to the transmission element 70 occurs through the bearing ring 68 of the actuating bearing 54 connected tightly with the piston plate 72. The latter overlaps the actuating bearing 54 radially inside and forms an axial shoulder 91, which is axially overlapped by a radial outside shoulder 92 disposed on the sealing plate 85 formed on the axial shoulder 92, whereby a ring seal 93 is disposed between the shoulders 91, 92. Upon displacement of the transmission element 70 after pressurization through the ring piston 60 the respective sleeve-shaped shoulders 91, 92 are displaced axially relative to one another. Depending on fixation of the ring seal, said seal slides thereby on one of the two annular surfaces of the shoulders 91, 92.

Through the described seals, the annular chamber 58 is sealed outwardly, and it can contain a larger volume of lubricant for the actuating bearing 53, 54 and support bearing 87. Alternatively, the fluid serving as lubricant contained in the annular chamber 58 can be circulated by means of a supply line 54 and a return line—not depicted. For this purpose, in a further hydraulic circuit, a pump provided for actuation of the slave cylinders 55, 56 can be used. Alternatively, in the annular chamber 58, a spray fogging of the surfaces to be lubricated and cooled can be used.

LIST OF REFERENCE SYMBOLS 1 actuating device
2 axis of rotation
3 friction clutch
4 friction clutch
5 pressure-exerting plate
6 cover part
7 cover part
8 clutch cover
9 crankshaft
10 torsional vibration damper
11 dual mass flywheel
12 input part
13 energy accumulator
14 output part
15 tooth profile
16 tooth profile
17 energy accumulator
18 axial projection
19 bearing
20 transmission housing
20a axial shoulder
21 transmission input shaft
22 transmission input shaft
23 transmission
24 pressure plate
25 pressure plate
26 clutch disk
27 clutch disk
28 friction lining
29 friction lining
30 transmission element
31 piston plate
32 actuating device
32a actuating device
33 slave cylinder
34 pressure chamber
35 slave cylinder housing
36 ring piston
37 actuating bearing
38 web
39 support bearing
40 tie bar
41 rivet
42 transmission element
43 piston plate
44 web
45 actuating bearing
46 ring piston
47 pressure chamber
48 slave cylinder
49 pressure line
50 sealing washer
51 sealing washer
52 actuating system
53 actuating bearing
54 actuating bearing
55 slave cylinder
56 slave cylinder
57 slave cylinder housing
58 annular chamber
59 ring piston
60 ring piston
61 U-seal
62 U-seal
63 pressure chamber
64 pressure chamber
65 bearing ring
66 bearing ring
67 bearing ring
68 bearing ring
69 transmission element
70 transmission element
71 piston plate
72 piston plate
73 rolling bodies
74 rolling bodies
75 ring seal
76 ring seal
77 sealing plate
78 clutch cover
80 shoulder
81 section
82 ring seal
83 axial projection
84 step
85 sealing plate
86 stop ring
87 support bearing
88 step
89 ring gap
90 ring seal
91 axial projection
92 axial projection
93 ring seal
94 supply line

What I claim is:

1. A double clutch, comprising:
two friction clutches driven by a drive unit with a clutch cover;
a pressure-exerting plate connected rigidly with said clutch cover with two pressure-exerting surfaces; and
two axially displaceable pressure plates, each respectively facing one of the pressure-exerting surfaces,
whereby between each pressure plate and the pressure-exerting plate, a friction lining of a clutch disk connected non-rotatably with respectively a transmission input shaft of a transmission can be clamped to establish frictional engagement through axial pressure-exertion by the pressure plates by means of a respective actuating device,
wherein each one of the pressure plates is actuated by a respective transmission element pressurized by the respective actuating device, the each one of the pressure plates and the respective transmission element being displaced axially by a same amount as an actuation stroke set by the respective actuating device;
wherein both actuating devices are disposed in a common housing around both transmission input shafts, and the housing is rotatably disposed on the clutch cover by a first bearing and supported non-rotatably on a transmission housing of the transmission, and
wherein the clutch cover is mounted axially fixed and rotatable on an axial shoulder of the transmission housing by a loose second bearing.

2. The double clutch according to claim 1, wherein the clutch cover features an axial projection towards the transmission, on which the housing is received and by which the double clutch is supported rotatably on the transmission housing.

3. The double clutch according to claim 1, wherein at least one of the friction clutches is a forcefully closed friction clutch.

4. The double clutch according to claim 1, wherein both friction clutches are forcefully closed friction clutches, whereby actuation strokes for closing said clutches are oppositely oriented.

5. The double clutch according to claim 1, wherein the actuating devices are operated by hydrostatic means.

6. The double clutch according to claim 5, wherein the common housing of the actuating devices is a slave cylinder housing, in which an externally pressurized slave cylinder is installed for pressurizing a transmission element respectively.

7. The double clutch according to claim 6, wherein the slave cylinder features a ring piston respectively, which is axially displaceable inside a pressure chamber that can be pressurized from outside and whereby an interposed actuating bearing actuates the transmission elements.

8. The double clutch according to claim 6, wherein an annular chamber that is sealed outwards is formed between the transmission elements and the slave cylinder housing.

9. The double clutch according to claim 8, wherein the annular chamber is filled with fluid at least partially.

10. The double clutch according to claim 9, wherein the fluid features lubricating and/or cooling properties.

11. The double clutch according to claim 9, wherein the fluid is circulated by a pump disposed outside the annular chamber.

12. The double clutch according to claim 9, wherein the fluid in the annular chamber is fogged.

13. The double clutch according to claim 8, wherein the annular chamber between the transmission elements and the ring piston sealed against the slave cylinder housing is sealed by an actuating bearing sealed radially outside the rolling bodies.

14. The double clutch according to claim 8, wherein the annular chamber between transmission elements forming the piston plates and the clutch cover are radially sealed by means of axially displaceable piston plates.

15. The double clutch according to claim 14, wherein at least a sealing plate is formed by a bearing ring of an actuating bearing.

16. The double clutch according to claim 15, wherein the bearing ring is a bearing ring provided radially outside.

17. The double clutch according to claim 14, wherein the piston plates are formed as sleeves, whereby an axial end section is axially fixed and sealed with an internal circumference of the transmission element, with the clutch cover or with a component connected with said cover and an opposite axial end section against an internal circumference of the corresponding transmission part is axially displaceable, with the clutch cover or is sealed axially displaceably with a component connected with said cover by means of a ring seal.

18. The double clutch according to claim 17, wherein on the axial projection of the clutch cover a sleeve-shaped sealing plate is axially fixed and sealed, which is sealed axially displaceably relative to the bearing ring of an actuating bearing featuring an axial shoulder.

19. The double clutch according to claim 8, wherein the first bearing for rotatable mounting of the slave cylinder housing on the axial projection is mounted on the sleeve-shaped sealing plate connected with the clutch cover.

20. The double clutch according to claim 1, wherein the pressure chambers of the slave cylinder respectively are supplied with pressure by means of a pressure line coming from the transmission housing.

21. The double clutch according to claim 20, wherein the pressure is provided by a transmission pump, a master cylinder or an electric pump unit.

22. The double clutch according to claim 11, wherein the fluid in annular chamber is circulated by means of a pump via a supply line and return line from the transmission housing.

23. The double clutch according to claim 6, wherein the slave cylinder housing features a torque multiplier against the transmission housing.

24. The double clutch according to claim 23, wherein the torque multiplier is formed at least by one of the pressure lines, the supply line and/or return line.

25. A friction clutch, comprising:
a clutch cover driven by a drive unit and a pressure-exerting plate connected rigidly with said cover, with pressure-exerting surfaces as well as axially displaceable pressure plate facing one of these pressure-exerting surfaces,
whereby between the pressure plate and the pressure-exerting plate, a friction lining of a clutch disk is connected non-rotatably with one transmission input shaft of a transmission for establishing frictional engagement through axial pressure-exertion by the pressure plate by an actuating device can be clamped,
wherein the pressure plate is actuated by means of a transmission element pressurized by the actuating device and the pressure plate is displaced axially by a same amount as an actuation stroke set by the actuating device,
wherein the actuating device is disposed in a housing around the transmission input shaft, and the housing is rotatably disposed on the clutch cover by a first bearing and supported non-rotatably on a transmission housing of the transmission, and
wherein the clutch cover is mounted axially fixed and rotatable on an axial shoulder of the transmission housing by a loose second bearing.

26. The friction clutch according to claim 25, wherein the actuating device is mounted rotatably by means of the first bearing and the first bearing as well as an actuating bearing provided between the actuating device and the transmission element are accommodated in a common annular chamber.

* * * * *